Figure 1:
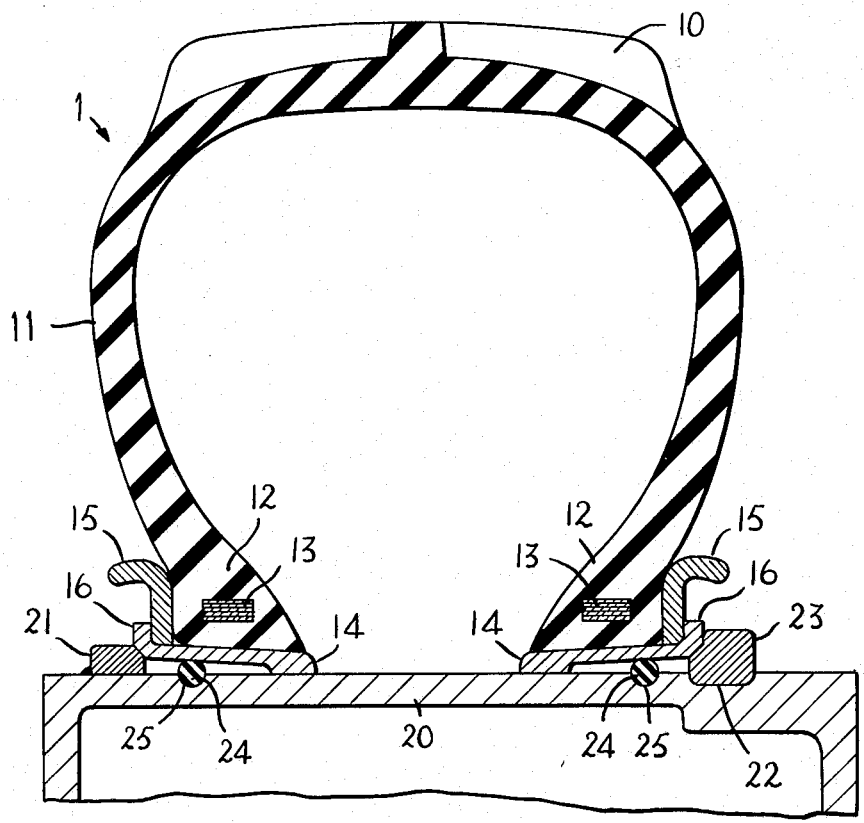

United States Patent

Verdier

[11] 3,913,653
[45] Oct. 21, 1975

[54] PNEUMATIC TIRES
[75] Inventor: Henri Verdier, Beauregard-L'Eveque, France
[73] Assignee: Compagnie Generale des Etablissements Michelin, raison sociale Michelin & Cie, France
[22] Filed: Apr. 9, 1973
[21] Appl. No.: 349,399

Related U.S. Application Data
[63] Continuation of Ser. No. 145,336, May 20, 1971, abandoned.

[30] Foreign Application Priority Data
May 29, 1970  France .............................. 70.19928

[52] U.S. Cl. ................ 152/397; 152/362; 152/379; 152/409
[51] Int. Cl.² .......................................... B60C 5/16
[58] Field of Search ........... 152/410, 409, 362, 396, 152/397, 379

[56] References Cited
UNITED STATES PATENTS

| | | | |
|---|---|---|---|
| 1,786,957 | 12/1930 | Mueller | 152/362 |
| 1,894,238 | 1/1933 | Musselman | 152/410 X |
| 2,614,603 | 10/1952 | Howley | 152/410 X |
| 2,929,430 | 3/1960 | Sinclair et al. | 152/409 |
| 3,448,783 | 6/1969 | Sons | 152/362 |
| 3,623,530 | 11/1971 | Beyers | 152/410 |

Primary Examiner—Robert J. Spar
Assistant Examiner—Jerold M. Forsberg
Attorney, Agent, or Firm—Brumbaugh, Graves, Donohue & Raymond

[57] ABSTRACT

An easily mountable and removable pneumatic tire has bead seats which are an integral part of the tire.

2 Claims, 2 Drawing Figures

U.S. Patent Oct. 21, 1975 3,913,653

INVENTOR
HENRI VERDIER
BY his ATTORNEYS

PNEUMATIC TIRES

This is a continuation of U.S. application Ser. No. 145,336, filed May 20, 1971, now abandoned.

The present invention relates to improvements in pneumatic tires. It is applicable in particular to tires of large or very large dimension used on construction vehicles.

The mounting and particularly the removal of a tire of very large size are difficult and lengthy operations. The putting in place and/or removal of a wheel equipped with such a tire require the immobilizing of the vehicle for a substantial period of time, if only because of the large number of bolts and nuts which must be tightened and/or loosened. Furthermore, the removal of a tire from the rim requires the unwedging of the beads clamped onto the fixed and removable bead seats, which requires the use of special tools which may cause damage to the beads. Finally, the handling of tires of large size which may weigh several tons is effected by means of slings which are passed around the beads and may damage them.

The present invention, based on an improvement in the tires, is directed at facilitating and accelerating the mounting and removal as well as the handling of the tires and at eliminating the risk of damage to the beads during such operations.

The pneumatic tire in accordance with the invention which has in the extension of its tread two walls terminating in beads which are separate from each other is characterized by the fact that each bead is provided on its bearing surface with one or more annular metal parts permanently fastened to the bead, said parts serving as bead seats and being intended to rest on a cylindrical support which is rigidly connected with the vehicle and serves as the rim base.

The tire is thus characterized by the fact that it has incorporated bead seats. The mounting and removal operations then consist solely in causing said bead seats to slide over a cylindrical support forming an integral part of the vehicle and provided on one side with a fixed stop and on the other side with a removable stop. As the bead seats are incorporated in the tire and constitute a sort of simplified rim which is integral with the tire, it is no longer necessary to try to remove them from the tire. They furthermore constitute a protection for the beads during the handling of the tire.

The cylindrical support which is rigidly connected with the vehicle and serves as the rim base may, for instance, be a gear-reduction housing such as the hubs of construction vehicles are equipped with. In this way one also dispenses with an independent rim and its fastening members.

Figure 2:
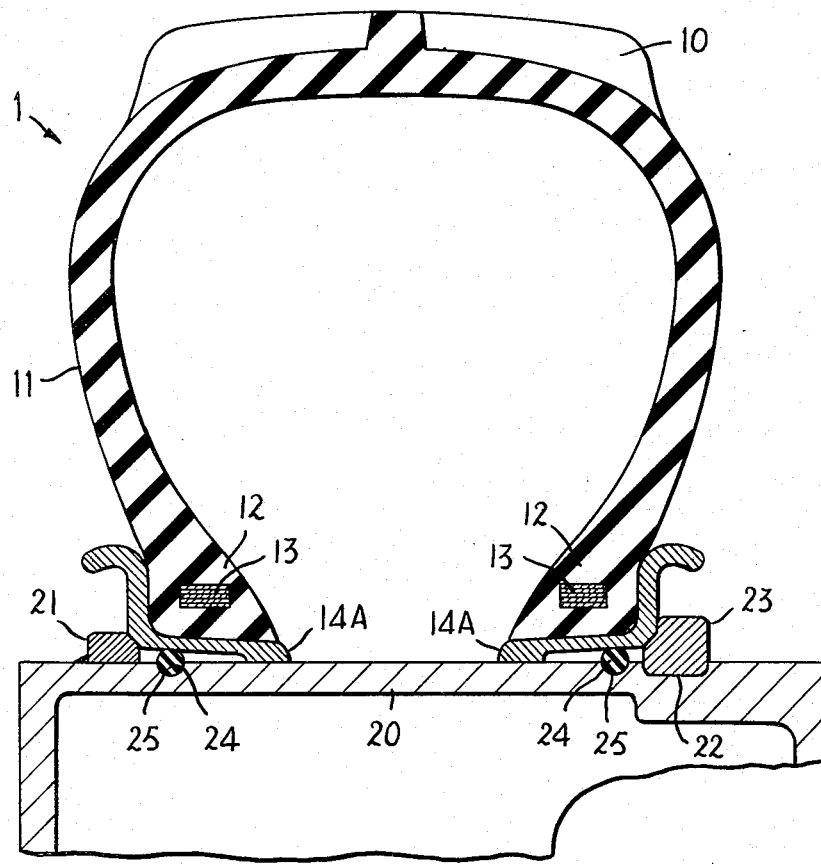

The invention will be fully understood from the accompanying drawing wherein FIG. 1 and FIG. 2 show a radial section through two different embodiments or variations of a tire in accordance with the invention.

Referring to the drawing, a tire 1 has a tread 10 and two identical side walls 11 which terminate in two separate and identical beads 12. Each bead has on the inside a metal core 13 which makes it practically nonstretchable.

In accordance with the invention, the beads are provided on their bearing surface with one or more permanently attached annular parts. The two variants or embodiments have been shown in FIGS. 1 and 2 of the drawing. In FIG. 1 of the drawing the bead is provided with an annular part 14 which forms a bead seat and is permanently wedged in the radially-inner face of the bead 12. The bead is also provided along its axially outer face with an annular rim 15 locked between the bead 12 and the hook 16 of the bead seat 14.

In FIG. 2 of the drawing, the bead is provided with a single annular part 14A constituting both the bead seat and the outer rim. However, it is preferable to use two separate parts of simpler shape and which are therefore easier to manufacture than a single piece.

The bead seat 14 and the rim 15 or, as a variant, the ring 14A are, in accordance with the invention, permanently fastened to the bead 12. These parts have, for instance, been force-fitted over the bead 12 and they can be detached from the bead only by destroying or damaging it. The bead seats thus form an integral part of the tire for its entire life in the same way as the cores 13 or the tread 10. The bead seats 14 and 14A do not, however, substitute for the cores 13 in their role of reinforcing the beads.

The FIGS. 1 and 2 of the drawing furthermore show how the tire provided with its bead seats is mounted. In the FIGS. 1 and 2 there can be noted a cylindrical support 20 serving as the rim base; this support is the housing of a gear transmission. The cylindrical support 20 has on the one side a fixed stop 21 located at some distance from one of the ends of the support 20. One of the bead seats is locked in position by the stop 21. The cylindrical support 20 has on the other side a groove 22 containing a split locking ring 23 forming a removable stop for the other bead seat. The removal of the ring 23 permits the mounting and removal of the tire. Finally, the cylindrical support 20 has two annular grooves 24 into each of which a gasket 25 is inserted so as to assure tightness between the support 20 and the bead seats 14 or 14A.

The surfaces of the bead 12, of the bead seats 14 or 14A and of the rim 15 which are in contact with each other may be cylindrical, conical, undulated, fluted, etc. The essential thing is that the assembly is permanent. One simple and advantageous solution consists in imparting to the base of the bead and the corresponding face of the bead seat an inclination of a few degrees with respect to the axis of the tire and/or of the bead seats in order to assure the fastening of the bead seat by wedging.

What is claimed is:

1. The combination for construction vehicles of a pneumatic tire having integral metal bead seats and a cylindrical rim base, which combination comprises
   1. a large size tubeless tire comprising
      a. a tread portion,
      b. two sidewalls, one on each side of said tread portion,
      c. two beads separate from each other terminating said sidewalls,
      d. a metal core inside each bead which makes it practically unstretchable, and
      e. separate metal bead seats integral with and permanently attached to each of the two beads of the tire, said metal bead seats having a cylindrical portion on their inner face for resting on and slidable along a cylindrical rim base, and
   2. a cylindrical rim base comprising
      f. a cylindrical support,
      g. two annular grooves in said cylindrical support, h. a separate gasket in each of said annular grooves, and i. means for locking said tire on to said cylindrical rim base, said tire being lockably mounted on said cylindrical rim base so as to have said separate gaskets beneath each of said integral metal bead seats and thereby assure air tightness between said cylindrical rim base and said integral metal bead seats of said tire.

2. The combination defined by claim 1 wherein the locking means on said cylindrical rim base comprises j. a fixed stop on one side thereof and k. a removable stop on the other side thereof, said stops being in separate locking engagement with each integral metal bead seat of said tire.

* * * * *